Aug. 28, 1928.
C. A. CAMPBELL
1,682,482
AIR BRAKE
Filed July 1, 1926   3 Sheets-Sheet 1
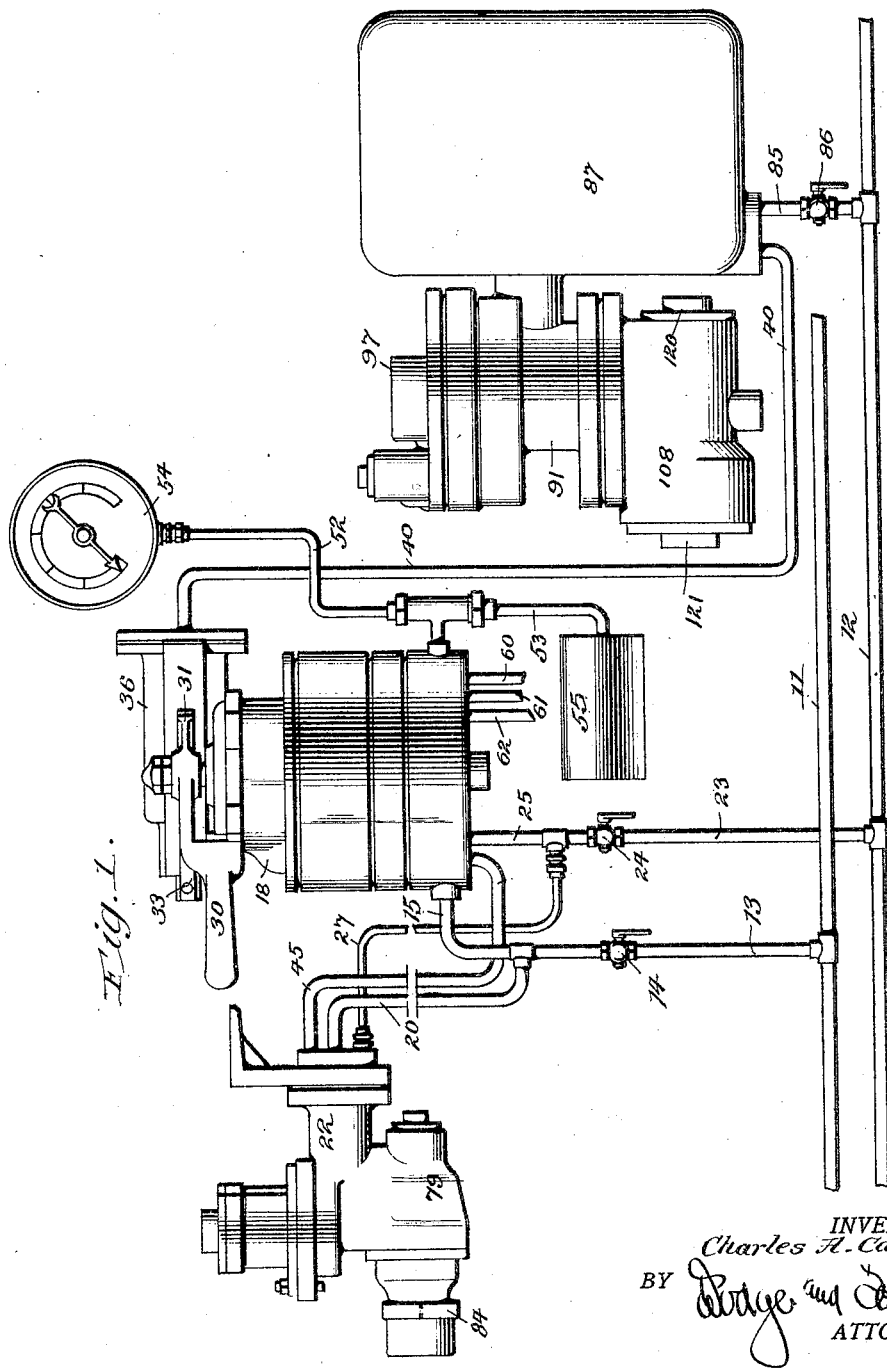
INVENTOR
Charles A. Campbell
BY
ATTORNEYS.

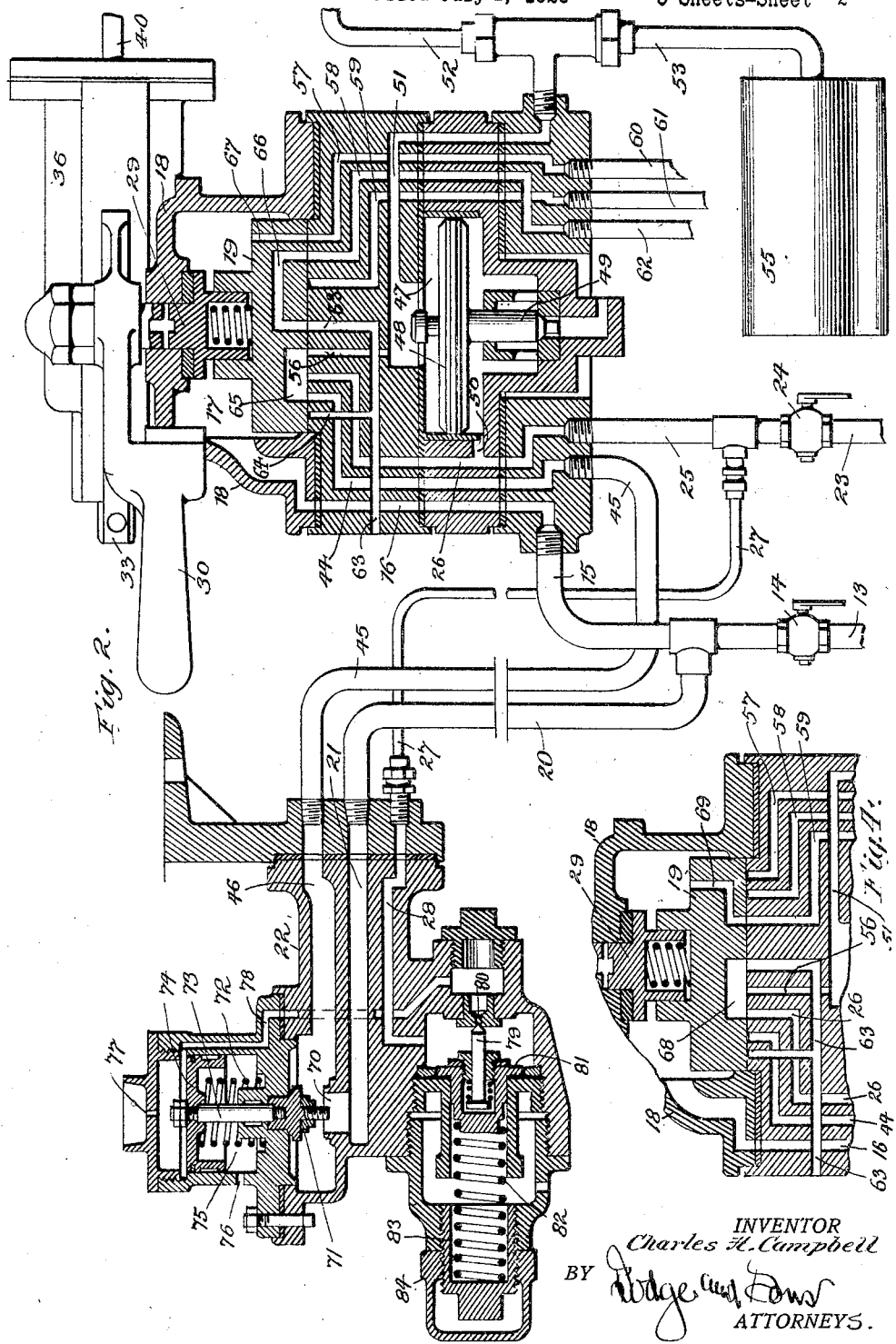

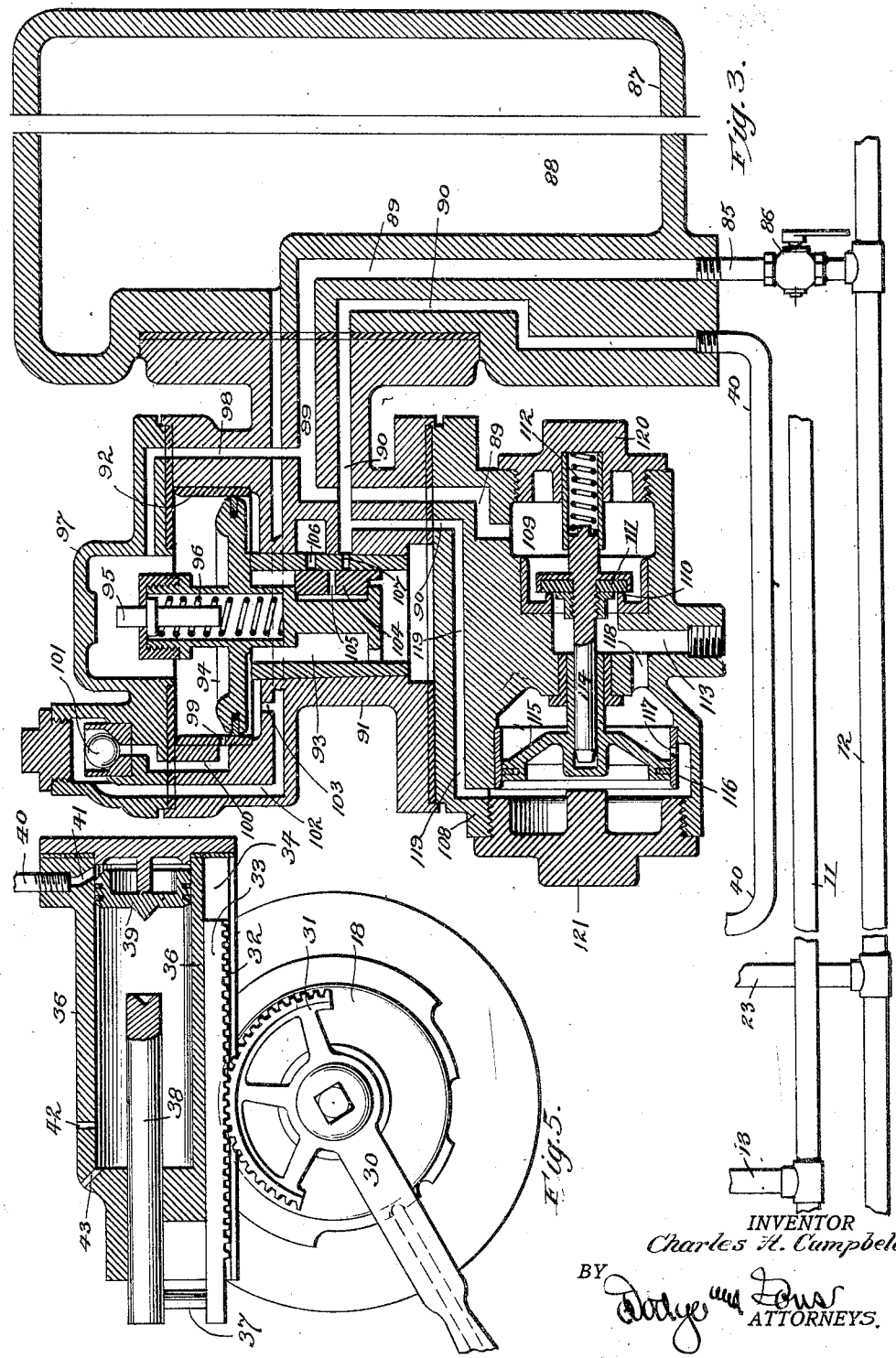

Patented Aug. 28, 1928.

1,682,482

UNITED STATES PATENT OFFICE.

CHARLES ALBERT CAMPBELL, OF WATERTOWN, NEW YORK, ASSIGNOR TO THE NEW YORK AIR BRAKE COMPANY, A CORPORATION OF NEW JERSEY.

AIR BRAKE.

Application filed July 1, 1926. Serial No. 119,956.

This invention relates to automatic air brakes and more particularly to such brakes for use on railway freight trains.

The increasing length of freight trains has rendered it desirable to use large capacity feed valves, which, under the control of the engineer's brake valve, feed air to the brake pipe in running position. In the case of applications made in the usual way by manipulating the engineer's brake valve, such large capacity feed valves occasion no difficulty, but they have been the cause of accidents when emergency applications were initiated at or near the rear of the train by manipulation of the conductor's valve.

In such a case the wave of reduced pressure moves forward through the brake pipe, causing the triple valves to move to emergency position in rapid sequence, and, when it reaches the locomotive, causing the brake pipe vent valve to open. If the engineer's brake valve is left in running position the feed valve opens also, but the vent valve counteracts its effect until the vent valve closes. When the vent valve closes the feed valve causes release to occur in the forward portion of the train.

The emergency application, as a result of the sequence of events above outlined, persists long enough to bunch the slack. The ensuing release of the brakes in the forward portion of the train causes this slack to run out, and frequently the train breaks in two. Instances are known where the train has been broken into three sections as the result of this action.

The present invention provides a device which counteracts this tendency. In its broadest aspects it includes a mechanism which is set into action by an emergency reduction occurring in the brake pipe and which, when put into action, shifts the engineer's brake valve to preclude any feeding action to the brake pipe.

Since the invention is primarily intended to overcome a condition incident to an emergency application, the logical and the preferred procedure is to shift the engineer's brake valve to emergency position, but it must be understood that the essential thing is to shift the engineer's brake valve away from brake pipe feeding positions, so that it will suffice to shift the valve either to service lap position or service position.

It is possible to combine the valve shifting motor with an automatic brake pipe vent valve of a type heretofore used. The combination is made in such a way that the vent valve controls the motor, and thus the motor is almost the only added mechanism. In this way a desirable timing is secured because the action is inherently such that the engineer's brake valve is shifted as the vent valve opens. As a further refinement, means are provided to maintain this vent open until the engineer's brake valve shall have been shifted away from its brake pipe feeding position, and then permit the vent to close.

The vent valve mechanism is of the type in which a piston is subjected to the opposing pressures of the brake pipe and a small reservoir, and controls the charging of the reservoir and also actuates a slide valve. When brake pipe air is reduced at a service rate the slide valve is shifted to a position in which it vents the reservoir at a similar rate. When shifted further against spring resistance by an emergency reduction, the slide valve admits pressure from the reservoir to the cylinder behind a piston which forces open the vent valve.

The device just described is modified so that the slide valve admits pressure fluid to the brake valve motor as well as to the vent valve operating cylinder.

In order to hold the vent open until the motor operating the brake valve has completely responded, the usual bleed port from the vent valve operating cylinder is relocated so that the brake valve motor opens the bleed port when it has completely responded, and this bleed port discharges the actuating pressure both from the motor and from the vent valve actuating mechanism. This renders the brake valve motor inert and the vent valve is closed by a spring and by brake pipe pressure conjointly.

The idea above described can be embodied in various approximately equivalent mechanisms, but I have used, and prefer, the one illustrated in the accompanying drawings, in which—

Figure 1 is an elevation somewhat diagrammatic in character, showing how the invention is applied to a known type of automatic air brake system.

Figure 2 is a vertical axial section through the engineer's brake valve and the feed valve, showing the engineer's brake valve in running position and the feed valve open.

Figure 3 is a vertical section of the vent valve mechanism in its normal running (charging) position.

Figure 4 is a fragmentary view, similar to a portion of Figure 2, showing the rotary valve of the engineer's brake valve in emergency position; and Figure 5 is a plan view of the engineer's brake valve shown in Figure 1, with the actuating motor in horizontal axial section.

Figures 2 and 3, above identified, considered together, show in section the essential portions of the mechanism illustrated in Figure 1. From Figure 1 the interconnections between Figures 1 and 2 can be readily traced.

In the drawings, a convention familiar in the air brake art has been adopted. That is to say, the ports are shown all in the same plane in order to render their action visible in a single view. It will be understood that the ports would ordinarily be differently located in order to secure a more compact structure and one simpler to manufacture.

Referring particularly to Figures 1, 2 and 3, the main reservoir pipe is shown at 11, and the brake pipe at 12. A branch 13 leads from the main reservoir pipe through a stop cock 14. This is connected by a branch 15 to the main reservoir passage 16 of the brake valve, which leads to the space 17 within the cap 18 and above the rotary valve 19.

Another branch 20 leads from the cock 14 to the main supply passage 21 of the feed valve, whose body is indicated generally by the numeral 22. The brake pipe 12 has a branch 23 which leads through a stop cock 24 directly connected by a pipe 25 with a brake pipe passage 26 in the engineer's brake valve. A small branch connection 27 leads from the pipe 25 to the controlling passage 28 in the body 22 of the feed valve. This last arrangement forms a part of the claimed subject matter of my application Serial No. 221,810, filed September 24, 1927, and hence is not here claimed.

The construction of the engineer's brake valve differs in no important respect from the standard brake valve except for the addition of the actuating motor and hence will be described very briefly.

The rotary valve 19 is turned by means of a stem 29 swiveled in the cap 18 and carrying the usual valve handle 30. Fixed on the valve handle 30 (see Figure 5), is a gear sector 31. This meshes with rack teeth 32 formed in a bar 33, which is slidable in a guideway 34. The guideway 34 is formed in the side of a cylinder 36 carried by the cap 18, the guideway 34 being parallel with the axis of the cylinder. The bar 33 is connected by a pin 37 with a piston rod 38 which passes through one end of the cylinder and is capable of entering into thrust relation with a free piston 39 which makes a close fit in the cylinder 36. Air to operate the piston 39 enters through a pipe 40 and port 41 at the right end of the cylinder and serves to force the piston 39 to the left.

When the engineer's brake valve is moved to full release position, the piston 39 is forced to the right hand end of the cylinder 36, the valve handle 30 is then free to be moved to any position, while the piston 39 remains at rest. If the piston 39 is subjected to pressure and moved to the left to the limit of its motion, it operates through the rod 38 to shift the valve handle 30 to its extreme right hand position, i. e., to emergency position. When it reaches the limit of such motion, a vent port 42 is overtraveled and operates to relieve the operating pressure on the piston 39. A vent port 43 permits the escape of air in advance of the piston 39.

In addition to the passages 16 and 20 already mentioned, the body of the engineer's brake valve is formed with a number of other passages and ports. The feed passage 44 leads from the seat of the rotary valve 19 to a pipe 45, which is connected to a feed passage 46 in the body 22 of the feed valve. There is also an equalizing cylinder 47 with the equalizing piston 48 and equalizing discharge valve 49. The space below the piston 48 is connected by a branch passage 50 with the brake pipe passage 26. The space above the piston 48 is connected by a passage 51 with connections 52 and 53 which lead respectively to the gage 54 and the equalizing reservoir 55. Passage 56 leads from the space above the piston 48 to the seat of the rotary valve 19. There are also three passages terminating in the valve seat as follows, a pump governor passage 57 and two automatic control valve passages 58 and 59. These are connected to the pipes 60, 61 and 62 in the order stated. There is also a preliminary exhaust passage 63 which leads to atmosphere, and which has a branch 64 also leading to the seat of the rotary valve 19.

Recess 65 in the valve 19 serves to connect the passages 44, 26 and 56 in running position, and it is through this recess that the brake pipe and the equalizing reservoir are both charged by the feed valve. A port 66 in the rotary valve 19 bridges the passages 58 and 63 in running position. A through port 67 in the rotary valve admits main reservoir air to the pump governor port 57 in running position. In emergency position, a recess 68 connects the passages 26 and 56 with the preliminary exhaust port 63, while a port 69 admits main reservoir air to the automatic control valve passage 59 (see Fig. 4).

Turning now to the feed valve, the passages 21 and 46 communicate with each other through the seat 70 of the main feed valve 71. This is shown open in Figure 2. It is urged in an opening direction by a spring 72 surrounding its stem 73, and may be forced closed by a piston 74 working in a cylinder 75. The space below the piston is vented to atmosphere at 76, and there is a minute bleed port at 77 from the space above the piston. Air under pressure is admitted to the space above the piston through a feed port 78 which is controlled by a pin valve 79 and its seat 80. Air pressure to be discharged under the control of the pin valve 79 arrives through the pipe 27 and port 28 from the brake pipe, and this pressure acts directly upon the regulating diaphragm 81 with which the pin valve 79 is connected, in a familiar manner, and by which the pin valve is operated. The diaphragm 81 is loaded by means of a spring 82 whose stress is adjusted by a threaded spring seat 83 locked in place by a threaded cap 84.

The structure of the feed valve need not depart essentially from standard practice, but it will be understood that the capacity of the port through the valve seat 70 is relatively large.

The admission of pressure to act against the piston 39 is controlled by a vent valve mechanism connected directly with the brake pipe 12. This connection is indicated at 85 and is controlled by a stop cock 86. The connections are made to a casting 87 containing a reservoir chamber 88 and two passages 89 and 90, the passage 89 being connected directly to the pipe 85 and the passage 90 being connected to a pipe 40 which, as already explained, is the pipe which admits operative pressure behind the piston 39 of the brake valve operating motor.

Bolted to the reservoir casting 87 is a casting 91 which forms the body of the vent valve mechanism, and in which are formed extensions of the ports 89 and 90. In the upper end of the casting 91 is a cylinder bushing 92 and below this is a valve chamber bushing 93. Working in the cylinder bushing 92 is the vent valve piston 94 which is formed with a guideway to receive a graduating stem 95 and graduating spring 96. The stem 95 collides with a boss on the cap 97. The port 98 branches from the brake pipe port 89 and leads to the space above the piston 94.

When the piston is in its lowermost position it uncovers a feed port 99 which leads to a passage 100. This extends to the seat of the check valve 101 from above which a passage 102 leads to the vent valve chamber or reservoir 88. A branch passage 103 leads from the passage 102 to the space below the piston 94, which is in direct communication with the space within the valve bushing 93.

The piston 94 is formed with a stem by which it is connected in the usual manner with a slide valve 104 having a through port 105. The valve 104 works on the valve seat in the valve bushing 93. This seat has two ports, the first an exhaust port 106, and the second a port 107 leading directly to the brake motor port 90.

Bolted to the lower face of the body casting 91 is a casting 108, which is formed with a chamber 109 connected to an extension of the brake pipe port 89. In the chamber 109 is a seat 110 upon which closes the brake pipe vent valve 111. This valve is urged in a closing direction by brake pipe pressure and also by a coil spring 112. It controls a vent passage 113 directly to the atmosphere.

The valve 111 is formed with a stem 114 which seats in a sleeve formed in the hub of a piston 115, so that the piston is in thrust relation with the valve and may open same when the piston is moved to the right. The piston 115 works in a bushing 116 and this bushing is formed with a through port 117. The space to the right of the piston 115 is connected to the vent port 113 by a passage 118, and when the piston is in its normal left hand position the space to the left of the piston 115 is connected to atmosphere by way of port 117, passage 118, and vent passage 113. The space to the left of the piston 115 is connected by a branch port 119 with the motor port 90.

Threaded caps 120 and 121 give ready access to the vent valve 111 and its actuating piston 115.

Assume that a locomotive equipped with the apparatus just described is connected to a train, that the train is proceeding with the engineer's brake valve handle 30 in running position. Obviously the piston 39 does not interfere with the manipulation of the brake valve and the engineer may operate the brakes by manipulating the valve handle 30 in the usual manner. If he makes a service reduction of pressure the piston 94 will rise until arrested by the stop 95, without compressing the spring 96. The parts are so dimensioned that in this position port 105 registers with exhaust port 106 and port 105 is so dimensioned that the pressure in the vent valve chamber 88 will be lowered at the service rate. Consequently, the pressure in chamber 88 falls at the same rate that brake pipe pressure falls in service application, and piston 94 moves no farther. When the service reduction terminates the piston 94 moves downward lapping the valve 104, and upon release the vent valve chamber 88 is recharged.

As the function of the vent valve mechanism is the same in all emergency applications, we will assume the condition under which the valve mechanism functions to prevent the undesired releasing action already described.

Assume, therefore, that while the engineer's brake valve remains in running position, an emergency reduction of brake pipe pressure is made at the rear end of the train. When the wave of reduced pressure reaches the piston 94, this will move to the extreme upward limit of its motion, overpowering the spring 96. Under these circumstances the exhaust port 106 is blanked and the supply port 107 is opened to the interior of the bushing 93, so that air from the vent valve chamber 88 flows by way of the port 102, branch port 103, valve bushing 93, port 107 to the port 90. From the port 90 this air flows through the pipe 40 to the space at the right of the piston 39 and through the port 119 to the space at the left of the piston 115.

Since the capacity for inflow of air exceeds the capacity of the port 117, the piston 115 immediately moves to the right hand limit of its motion, blanking port 117 and opening the vent valve 111. This gives a direct vent at the forward end of the train from the brake pipe, and assures the retention of the piston 94 in its uppermost position.

At the same time the piston 39, acting through the rack 32 and sector gear 31, shifts the engineer's brake valve to emergency position, and when the valve has been completely shifted to emergency position the vent 42 is open and bleeds away the actuating pressure which had shifted on piston 39 and piston 115. Consequently, the valve handle 30 is restored to free control by the engineer and the vent valve 111 closes.

If, however, the engineer should successfully resist the action of the piston 39 by holding the valve handle 30, he would prevent the piston 39 from reaching the limit of its travel. The vent 42 could not become effective, and consequently, pressure would persist on the piston 115 and the vent valve 111 would remain open until the engineer allowed the engineer's brake valve handle to move to emergency position.

It will be obvious, from what has been said, that by shortening the travel of the piston 39 and properly locating the vent 42, the piston 39 could be caused to move the handle 30 through only a portion of its total range of motion, for example, to service lap position or service application position, and as before, resistance by the engineer to the motion of the valve handle would have the effect of prolonging the vent from the brake pipe.

Other changes involving only mechanical skill may obviously be made.

What is claimed is:

1. The combination with an automatic air brake system including a brake pipe, and an engineer's brake valve having a brake pipe feeding function, of means operable by an emergency reduction of brake pipe pressure arranged when operated to suspend such feeding function of the brake valve.

2. The combination with an automatic air brake system including a brake pipe and an engineer's brake valve having a brake pipe feeding function in one or more positions which is supended in another position or positions, of means operable by an emergency reduction of brake pipe pressure arranged when operated to shift said valve to a non-feeding position.

3. The combination with an automatic air brake system including a brake pipe and an engineer's brake valve having a brake pipe feeding function in one or more positions, and one or more brake application positions in which said feeding function is suspended, of means operable by an emergency reduction of brake pipe pressure arranged when operated to shift said engineer's brake valve to an application position.

4. The combination with an automatic air brake system including a brake pipe and an engineer's brake valve having a brake pipe feeding function in one or more positions and an emergency application position in which said feeding function is suspended, of means operable by an emergency reduction of brake pipe pressure arranged when operated to shift said engineer's brake valve to emergency application position.

5. The combination with an automatic air brake system including a brake pipe and an engineer's brake valve having a brake pipe feeding function in non-applying positions which is suspended in other positions, of a mechanism operable by an emergency reduction of brake pipe pressure and serving when operated to vent the train pipe and simultaneously move said brake valve away from non-applying positions.

6. The combination with an automatic air brake system including a brake pipe and an engineer's brake valve having a brake pipe feeding function in non-applying positions which is supended in other positions, of a brake pipe vent valve mechanism; a mechanism operable to shift the engineer's brake valve away from non-applying positions; and means responsive to an emergency reduction of brake pipe pressure and arranged to operate said mechanisms.

7. The combination with an automatic air brake system including a brake pipe and an engineer's brake valve having a brake pipe feeding function in non-applying positions which is suspended in other positions, of a brake pipe vent valve mechanism; a mechanism operable to shift the engineer's brake valve away from non-applying positions; and an operative connection between said mechanisms arranged to maintain said vent valve open until said brake valve is shifted and thereafter cause it to close.

8. The combination with an automatic air brake system including a brake pipe and an engineer's brake valve having a brake pipe feeding function in non-applying positions which is suspended in other positions; of a reservoir; a piston subject to the opposing pressures in said brake pipe and reservoir and controlling the charging of the latter from the former; a brake pipe vent valve; means normally urging said vent valve closed; a cylinder, a second piston thereon for forcing said valve open; a pneumatic motor for moving said brake valve away from non-applying positions; and a valve connected with the first named piston and arranged to be opened thereby upon an emergency reduction of brake pipe pressure to admit air from said reservoir to shift the second piston and actuate said motor.

9. The combination with an automatic air brake system including a brake pipe and an engineer's brake valve having a brake pipe feeding function in non-applying positions which is suspended in other positions; of a reservoir; a piston subject to the opposing pressures in said brake pipe and reservoir and controlling the charging of the latter from the former; a brake pipe vent valve; means normally urging said valve closed; a cylinder; a second piston thereon for forcing said valve open; a pneumatic motor for moving said brake valve away from non-applying positions; a valve connected with the first named piston and arranged to be opened thereby upon an emergency reduction of brake pipe pressure to admit air from said reservoir to shift the second piston and actuate said motor; and means for venting the air acting against said second piston, upon the completion of operation of said motor.

10. The combination with an automatic air brake system including a brake pipe and an engineer's brake valve having a brake pipe feeding function in non-applying positions which is suspended in other positions; of a reservoir; a piston subject to the opposing pressures in said brake pipe and reservoir and controlling the charging of the latter from the former; a brake pipe vent valve; means normally urging said valve closed; a cylinder, a second piston thereon for forcing said valve open; a second cylinder; a piston therein connected to move said brake valve away from non-applying position; a supply conduit connecting said cylinders; and a valve connected with the first named piston and arranged to be opened thereby upon an emergency reduction of brake pipe pressure, to admit air from said reservoir to said supply conduit.

11. The combination with an automatic air brake system including a brake pipe and an engineer's brake valve having a brake pipe feeding function in non-applying positions which is suspended in other positions; of a reservoir; a piston subject to the opposing pressures in said brake pipe and reseroir and controlling the charging of the latter from the former; a brake pipe vent valve; means normally urging said valve closed; a cylinder, a second piston thereon for forcing said valve open; a second cylinder; a piston therein connected to move said brake valve away from non-applying position; a vent port in said second cylinder arranged to be overtraveled by the last named piston at its limit of operative motion; a supply conduit connecting said cylinders; and a valve connected with the first named piston and arranged to be opened thereby upon an emergency reduction of brake pipe pressure, to admit air from said reservoir to said supply conduit.

12. The combination with an automatic air brake system including a brake pipe, and an engineer's brake valve having a brake pipe feeding function in one or more positions which is suspended in another position or positions, of a mechanism operable by an emergency reduction of brake pipe pressure to open a brake pipe vent, and means controlled by the position of the engineer's brake valve and effective to prevent said vent from closing after the same has been so opened while said brake valve is in brake pipe feeding position.

13. The combination with an automatic air brake system including a brake pipe and an engineer's brake valve having a brake-pipe feeding function in non-applying positions which is suspended in another position, of a reservoir; a piston subject to the opposing pressures in said brake pipe and reservoir and controlling the charging of the latter from the former; a normally closed brake pipe vent valve; means for opening said valve through the response of said piston to a rapid reduction of brake pipe pressure; a pneumatic motor for moving said brake valve away from non-applying positions; and means also rendered operative by the response of said piston to a reduction of brake pipe pressure and when operative serving to admit air to said pneumatic motor.

In testimony whereof I have signed my name to this specification.

CHARLES A. CAMPBELL.